(12) United States Patent
Adams et al.

(10) Patent No.: US 7,051,010 B1
(45) Date of Patent: May 23, 2006

(54) EVENT BASED SYSTEM FOR USE WITHIN THE CREATION AND IMPLEMENTATION OF EDUCATIONAL SIMULATIONS

(75) Inventors: David L. Adams, Mesa, AZ (US); Scott L. Mitchell, Paradise Valley, AZ (US); Dariush Navabi, Phoenix, AZ (US); Jean-Paul O'Brien, Nederland, CO (US); Salvatore R. Sferlazza, Nanuet, NY (US); Malcolm P. Youngren, Chicago, IL (US); Teddy D. Zmrhal, Phoenix, AZ (US)

(73) Assignee: Smartforce PLC, Redwood City, CA (US)

( * ) Notice: Subject to any disclaimer, the term of this patent is extended or adjusted under 35 U.S.C. 154(b) by 366 days.

(21) Appl. No.: 09/668,056

(22) Filed: Sep. 21, 2000

Related U.S. Application Data
(60) Provisional application No. 60/155,004, filed on Sep. 21, 1999.

(51) Int. Cl.
*G06F 17/00* (2006.01)
*G06N 5/02* (2006.01)

(52) U.S. Cl. .............................. 706/47; 706/46; 706/11
(58) Field of Classification Search .................. 706/47, 706/46, 11; 434/236
See application file for complete search history.

(56) References Cited

U.S. PATENT DOCUMENTS

| | | |
|---|---|---|
| 5,676,551 A | 10/1997 | Knight et al. |
| 5,722,418 A | 3/1998 | Bro |
| 5,739,811 A | 4/1998 | Rosenberg et al. |
| 5,987,443 A | 11/1999 | Nichols et al. ................ 706/11 |
| 6,003,021 A | 12/1999 | Zadik et al. ................... 706/47 |
| 6,016,486 A | 1/2000 | Nichols ......................... 706/47 |
| 6,018,730 A | 1/2000 | Nichols et al. ................ 706/45 |
| 6,018,731 A | 1/2000 | Bertrand et al. ............... 706/47 |
| 6,018,732 A | 1/2000 | Bertrand et al. ............... 706/60 |
| 6,023,691 A | 2/2000 | Bertrand et al. ................ 706/2 |
| 6,023,692 A | 2/2000 | Nichols ........................ 706/14 |
| 6,026,386 A | 2/2000 | Lannert et al. ................ 706/45 |
| 6,029,156 A * | 2/2000 | Lannert et al. ................ 706/11 |
| 6,029,158 A | 2/2000 | Bertrand et al. ............... 706/45 |
| 6,029,159 A | 2/2000 | Zorba et al. ................... 706/47 |
| 6,032,141 A | 2/2000 | O'Connor et al. ............. 706/45 |
| 6,073,127 A | 6/2000 | Lannert et al. ................ 706/45 |
| 6,085,184 A | 7/2000 | Bertrand et al. ............... 706/45 |
| 6,101,489 A | 8/2000 | Lannert et al. ................ 706/45 |
| 6,125,358 A | 9/2000 | Hubbell et al. ................ 706/11 |
| 6,134,539 A | 10/2000 | O'Connor et al. ............. 706/45 |
| 6,144,938 A | 11/2000 | Surace et al. |
| 6,319,010 B1 | 11/2001 | Kikinis |
| 6,651,044 B1 | 11/2003 | Stoneman |
| 6,658,388 B1 | 12/2003 | Kleindienst et al. |

* cited by examiner

*Primary Examiner*—Joseph P. Hirl
(74) *Attorney, Agent, or Firm*—Bell, Boyd & Lloyd

(57) ABSTRACT

The present invention provides a method of creating a conversation in an educational simulation for a learner comprising the steps of providing simulation software code, providing a dynamic data model comprising tasks and statements, receiving a statement made by the learner, and generating a list of possible statements for the learner to make from the statements within the dynamic data model. Also provided is a system for performing the method.

30 Claims, 13 Drawing Sheets

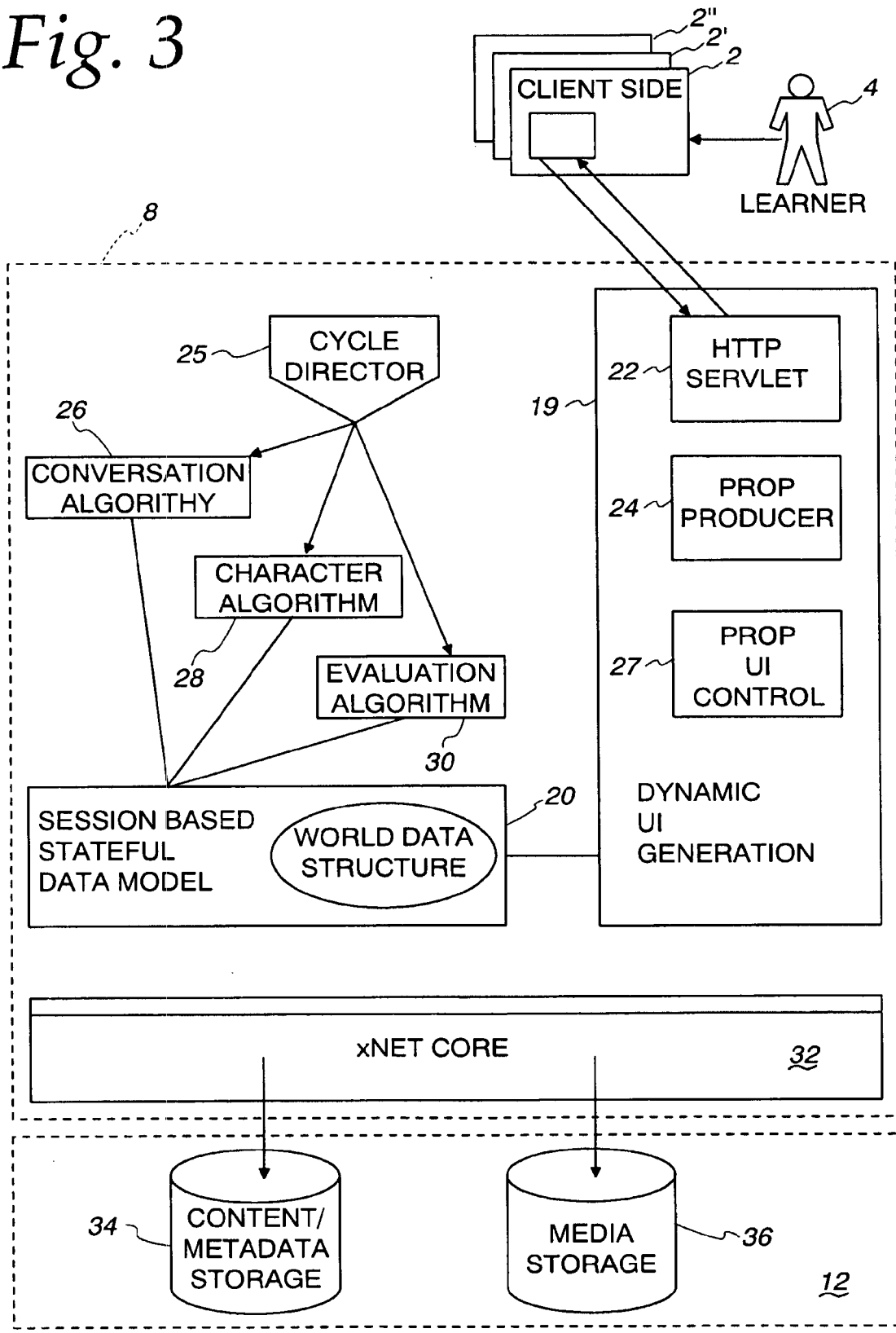

EVENT BASED SYSTEM FOR USE WITHIN THE CREATION AND IMPLEMENTATION OF EDUCATIONAL SIMULATIONS

RELATED APPLICATIONS

This application claims the benefit of U.S. Provisional Application No. 60/155,004, filed on Sep. 21, 1999, which is hereby incorporated by reference and made a part of the present specification.

TECHNICAL FIELD

The present invention relates to the field of educational simulation creation. More specifically, the present invention relates to an event and action based system for simplifying the process of creating an educational simulation.

BACKGROUND OF THE INVENTION

Traditionally, all computer software contains two fundamental constructs: data and the functions that manipulate the data. Historically, educational simulations have blended the two together. Most educational simulation use tree structures to define where the student is in the simulation, and within each node of the tree, there has been both data and functions that control the data. The problem is that this is very inefficient because it spreads the programming throughout the data and tree and makes finding "bugs" more difficult. Therefore, in the past, the level of skill required to create an educational simulation has been very high. Educational simulation creation has typically required someone with significant computer programming skills.

The present invention solves this problem by separating the data from the functions that manipulate the data. The control functions have been separated into algorithms which are separate from the data of the simulation. By creating a custom control algorithm, the present invention has also enforced quality because all simulation designers have to create simulations that conform to the algorithm. Another benefit to this model is increased speed of operation due to the streamlining of each algorithm for its specific purpose.

Another way to create educational simulations would be to use a rule-based expert system or other traditional Artificial Intelligence technologies. In a rule-based expert system there are rules, facts and an inference engine. First, the system asserts facts, then the rules run and "inferences" are made. An example is:

```
    Assert Fact → MopsyDog has #ofMopsyLegs, TypeofMopsyFur
    Assert Fact → #ofMopsyLegs = 3
    Assert Fact → #ofMopsyLegsGrowing = 0
    Assert Fact → TypeofMopsyFur = Brown
    Run Rule → #ofMopsyLegs = #ofMopsyLegs +
    #ofMopsyLegsGrowing
    Run Rule → if (?Variable? has (Legs = 4) and (Fur = Brown))
    then (Assert Fact – ?Variable? = Dog)
Run Inference Engine
Results:
    Fact → MopsyDog has (#ofMopsyLegs = 3),
    (TypeofMopsyFur = Brown)
    Assert Fact → #ofMopsyLegsGrowing = 1
Run Inference Engine
Results:
    Fact → MopsyDog has (#ofMopsyLegs = 4),
    (TypeofMopsyFur = Brown)
    Fact → MopsyDog is Dog
```

A Rule-Based Expert System is used to define new facts such as "MopsyDog is Dog." It could be used to control an educational simulation. There are two big drawbacks to using an inference engine to control an educational simulation. First, AI technologies and rule-based expert systems use too much of a computer's random access memory. The amount of analysis required for the inference engine is great. Second, the artificial intelligence technologies allow for main control structures to mix data and functions. By allowing the mixture of functions and data, the amount of debugging and expertise in programming each simulation is greater than the present invention.

SUMMARY OF THE INVENTION

The present invention provides a method of creating a conversation in an educational simulation for a learner comprising the steps of providing simulation software code, providing a dynamic data model comprising tasks and statements, receiving a statement made by the learner, and generating a list of possible statements for the learner to make from the statements within the dynamic data model. Also provided is a system for performing the method.

Other features and advantages of the invention will be apparent from the following detailed description taken in conjunction with the drawings.

BRIEF DESCRIPTION OF THE DRAWINGS

FIG. 3 is a diagram of the system of the present invention according to a preferred embodiment;

FIG. 4b is a continuation of the flow chart of FIG. 4a;

FIG. 4c is a continuation of the flow chart of FIGS. 4a and 4b;

FIG. 4d is a continuation of the flow chart of FIGS. 4a, 4b, and 4c;

FIG. 4e is a continuation of the flow chart of FIGS. 4a, 4b, 4c, and 4d;

DETAILED DESCRIPTION OF THE PREFERRED EMBODIMENT

While this invention is susceptible of embodiments in many different forms, there will herein be described in detail preferred embodiments of the invention with the understanding that the present disclosure is to be considered as exemplifications of the principles of the invention and is not intended to limit the broad aspects of the invention to the embodiments illustrated.

The present invention relates to a novel training software, system and method for teaching users how to perform a task. Users of the system learn the task by operating a computer which simulates a real world experience in which the task is performed. Users have options to use simulated tools to perform the task and interact with simulated people or characters in order in performing the task Additionally, the user of the system is evaluated in the choices that a person makes to perform the task. The evaluation can be performed in a variety of ways, such as assigning an overall score to the person's performance in the simulation or assigning a running average to the person's performance to determine whether the person has improved or has learned by performing the simulation, and no single way is the correct way, but should be tailored to the type of simulation executed. By using the simulation, learners can learn to perform a task in an environment where the learner's mistakes are not costly to their employer but still gain the experience of "learning by doing."

Figure 1:
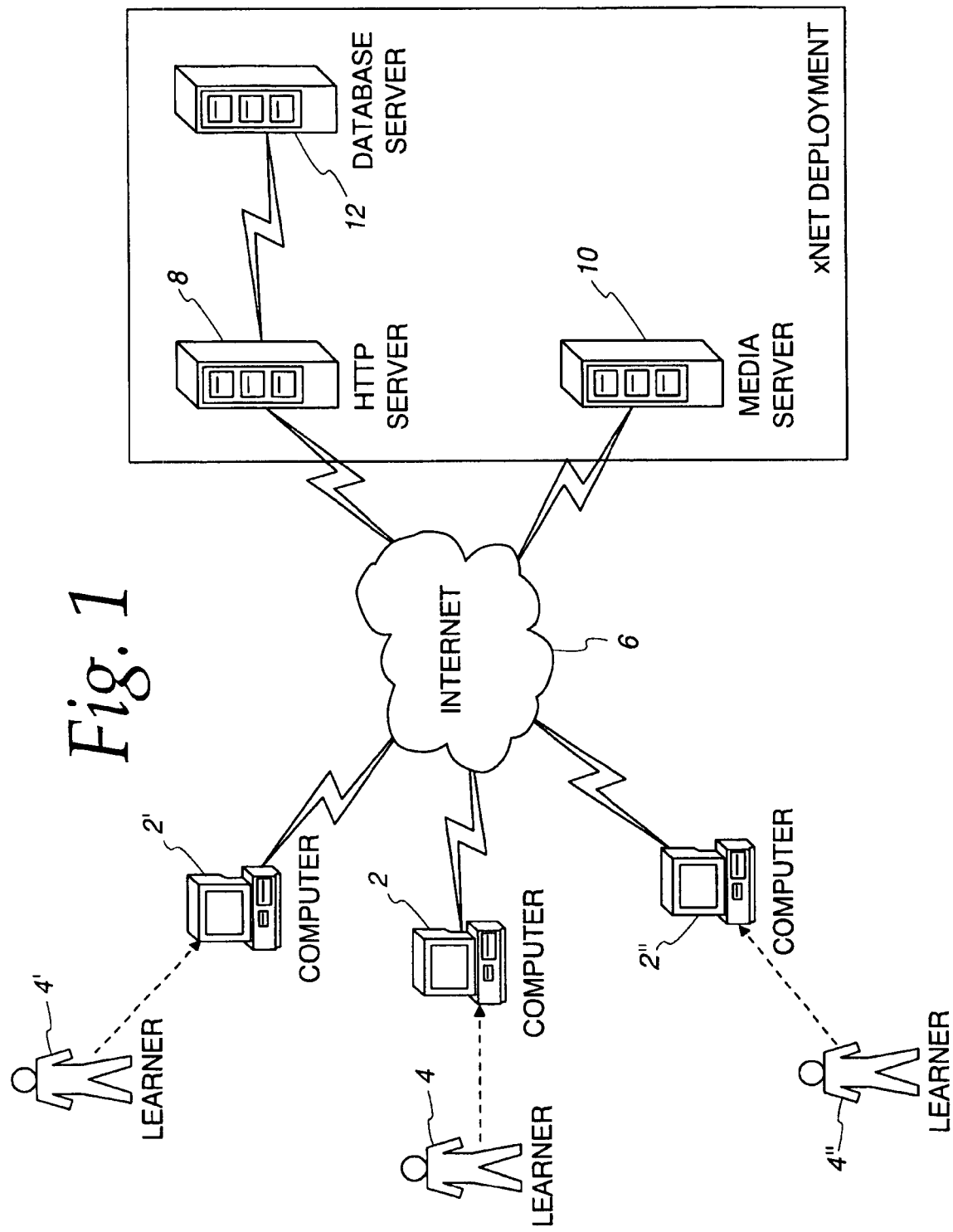
FIG. 1 is a diagram of the system of the present invention according to a preferred embodiment.

Referring to FIG. 1, there is shown a client computer 2 accessible by a learner 4. The client computer 2 is any computer capable of running software that can access and view content over a computer network, preferably a wide area network such as the Internet 6. Most often, the client computer 2 is a personal computer running a Microsoft Windows or Mac OS operating system and an HTML browser, such as Microsoft Internet Explorer or Netscape Navigator. However, the client computer 2 can take any form, including a handheld device. Other software may also exist on the client computer 2 in order to access multimedia aspects of the learning process, such as streaming audio and video. Also connected to the Internet 6 is a simulation server 8 and. Optionally, a media server 10. The simulation server 8 comprises known HTTP server software, such as Microsoft Internet Information Server running on a Windows NT operating system, as well as software for creating the simulation. The simulation server 8 is responsive to requests from the client computer 2 to view learning content via the Internet 6. The simulation server 8 communicates with a database server 12 in order to provide the learning content. The simulation server 8 is also capable of communicating with multiple client computers 2, 2', 2" for different learners 4, 4', 4". It should be understood that the physical arrangement of FIG. 1 is representative, and the present invention can be implemented in numerous physical arrangements without departing from the scope of the present invention.

The objects, people and state of the simulation within any particular simulation comprises "the world" for the purposes of a simulation. The present state of the world at any particular moment within the simulation is represented by a world data structure. The world data structure contains variables which represent each aspect of the world at any point in time. Preferably, the world data structure is stored as an XML data structure which comprises variables containing information about the state of the world. In memory, the world comprises an object model. The types of data that is contained in the world are people, places, triggers, objectives and props. Each of these data types may have subtypes associated with them. For example, subtypes of props which exist in the world can be meetings having statements and outputs associated therewith, a desktop, a browser, having favorites, an email having an inbox, sent box, drafts box, and bin with email messages associated therewith. All of these data types are associated with properties and events which describe the item and give the item its states and properties for interaction with the world, as described below.

Referring to FIG. 3, the simulation server 8 executes software for creating the simulation and communicating the state of the simulation to the client computers 2, 2', 2". The simulation server 8 comprises components for maintaining the appearance of a dynamic user interface generation module 19, a cycle director 25, a conversation algorithm 26, a character algorithm 28, an evaluation algorithm 30, the world data structure 20, and a simulation CORE 32. The simulation server 8 communicates with the database server 12 to retrieve simulation user interface data from the content/metadata storage 34 and the media storage 36.

Significantly, the simulation server 8 is a stateless engine; only the world data structure 20 contains information about the state of the simulation. By providing that the simulation server 8, and in particular the code or software running thereon is independent of the state of the simulation, the present system can be used and reused to implement new simulations without reprogramming of the system itself. New simulations can be created by associating new peoples, places, triggers, objectives and props with the simulation. Therefore, the simulation server 8 acts as a static architecture around which simulations may be created. In this manner, the creation of a simulation and conversations therein becomes easier to perform. Software developers are no longer required in order to create even the most complex simulations and conversations.

The dynamic user interface generation module 19 further comprises a java servlet 22, a prop producer 24, and a prop 27. The java servlet 22 receives requests from the client computers 2, 2', 2" and transmits HTML and multimedia data which comprise the user interface of the simulation to the client computers 2, 2", 2" in response to the requests. The java servlet 22 also updates the prop producer 24 in response to actions taken by the learner. The client computer sends a request which takes the form http://servername.com/FirstPerson?Prop=Email&Enabled-true, where "http://" indicates the request is an http request, "servername.com" identifies the simulation server 8, "FirstPerson" identifies the java servlet 22 to be accessed, "?" indicates the beginning of values to be passed to the java servlet 22, "Prop=Email" is a variable and variable value to be passed, "&" indicates the beginning of a new variable and value to be passed, and "Enabled=true" indicates a new variable and value to be passed to the applet.

The prop producer 24 next communicates with the prop 27. The prop 27 then updates the state of the world data structure 20 by manipulating the structure 20 to represent the action taken by the learner 4. For example, if the learner in a simulation decided to open an email, the world data structure would be altered to indicate the email is now open.

The simulation server 8 also communicates with the cycle director 25. The cycle director 25 controls the process for determining how the simulation is going to react to an action taken by the learner 4. The cycle director 25 first executes the conversation algorithm 26. The combination of the conversation algorithm 26 and the world data structure 20 determine both how to respond to the statement made by the learner 4 and creates a list of statements which the learner can choose from in order to respond to the simulation.

Figure 2:
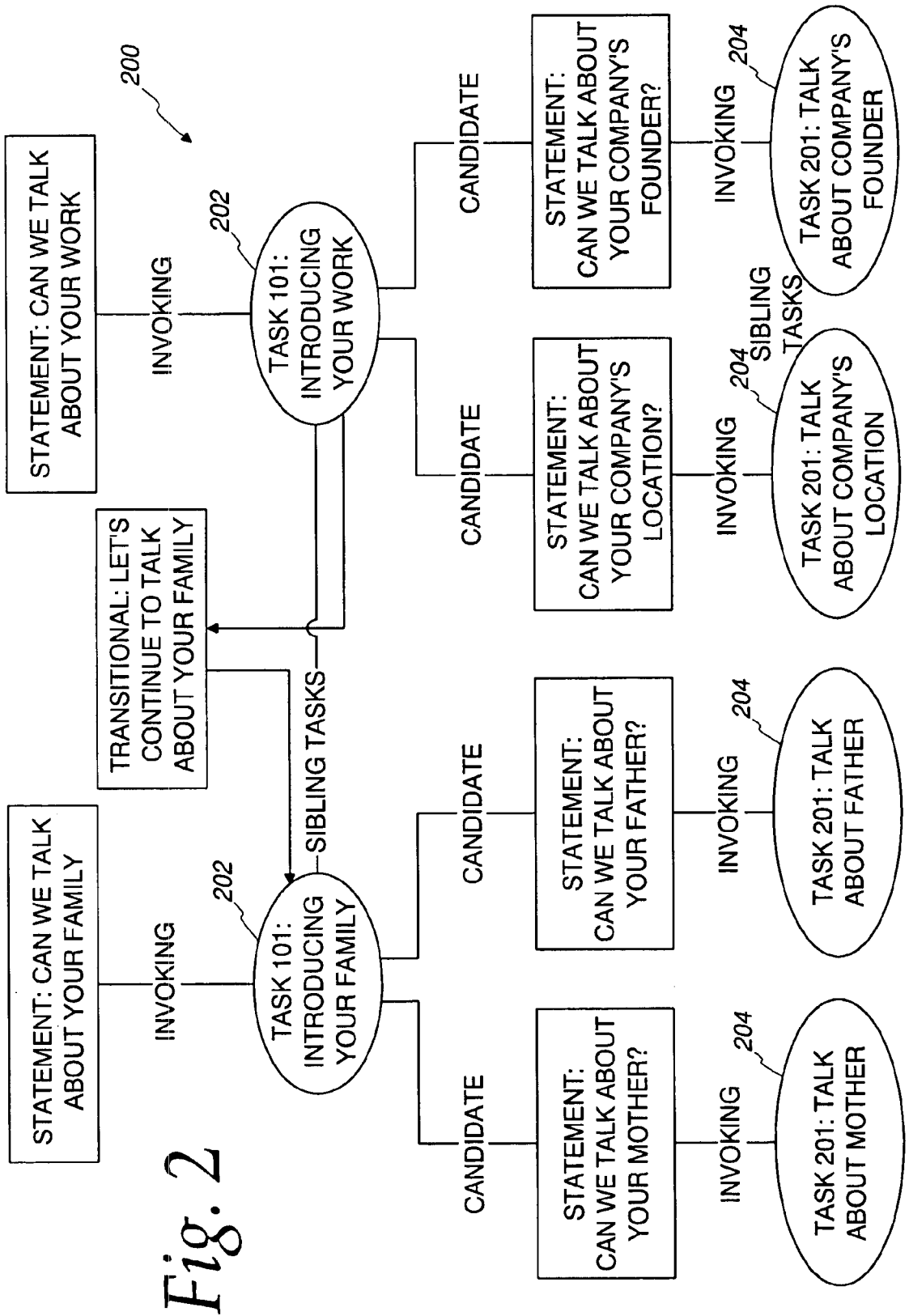
FIG. 2 is a diagram of a conversation tree structure of the present invention according to a preferred embodiment.

Conceptually, the present invention uses a tree structure in order to allow the learner to navigate within a simulation. Referring to FIG. 2, the tree structure 200 comprises multiple tasks 202, 204. An example of a task is introducing the members of a person's family. Groups of tasks comprise conversations, and tasks are subsections of conversation. An example of a conversation is talking about a person's family. Tasks are associated with each other in levels, with subtasks of a task called child tasks and higher level tasks called ancestor tasks. Tasks on the same level are sibling tasks. Associated with each task are statements which can be made. Statements may invoke subtasks or transition to sibling tasks. Exploratory conversations have transition statements which allow a learner to move between the tasks. Procedural conversations have a required or enforced sequence and, therefore, do not have transition statements. Statements which are associated with a current task are called candidate statements. Tasks may also be specific or directional. Statements presented to the user for selection when the current task is a specific task are the statements associated with the current task and the current task's sibling tasks. Statements presented to the user for selection when the current task is a directional task are the statements associated with the current task; therefore, the only way to move on to an ancestor task when performing a directional task is to complete the task. Finally, tasks may also be described as leaf tasks or non-leaf tasks. Leaf tasks are tasks which have no child tasks. While procedural and exploratory conversations and directional and specific tasks are described, it is to be understood that other types of conversations, tasks and statements can be implemented without departing from the scope of the present invention.

Clicking on a statement invokes a task. Associated with the task is a required proof and a proof contribution value. In order for a task to be complete, its required proof value must equal or be exceeded by the proof contribution provided by its child tasks. For example, consider a task with a proof contribution of 50 and three child tasks, and the first, second and third child tasks have proof contributions of 50, 20 and −10, respectively. If the first child task is chosen by the learner, the proof contribution (50) of the parent task is satisfied by the first task's proof contribution (50) and the second and third tasks are not required to be completed. However, if the third child task (with a proof contribution of −10) is chosen, the required proof of the parent task can only be met be the learner performing all three child tasks (50+20−10=60).

The conversation algorithm 26 implements the rules of conversation, sets triggers and fires events in order to maintain the simulation and provide the learner with logical options for response to the simulation. FIGS. 4a through 4e show how the conversation tree is maneuvered by the conversation algorithm 26. The conversation algorithm 26 is event driven. When an event is fired, the routines associated with the event are executed. The routines change the properties of the world in response the statements the learner has chosen to make. Specifically referring to FIGS. 4a and 4b, in step 400, the conversation algorithm 26 first clears any previous responses made by the learner 4. Next, the conversation algorithm 26 determines whether the selected conversation is currently running in step 402. If the conversation is not currently running, the algorithm 26 proceeds to step 404 where the algorithm 26 determines whether the isRejected property equals true for the conversation. An example of a rejected conversation would be an attempt to begin a conversation which assumes something that requires the learner to first complete, such as reading an email or completing a different conversation first.

If isRejected=true then the algorithm 26 fires the onRejected event in step 406. If isRejected=false the algorithm 26 next determines whether the selected conversation has previously been started in step 410. If the conversation has previously been started the algorithm 26 skips to step 416. If the conversation has not previously been started, the algorithm 26 starts the conversation in step 412 and fires the onConversationBegin event in step 414. In step 416 the algorithm 26 fires the OnConversationEnter event and proceeds to step 418.

If, in step 402 the selected conversation is currently started, the algorithm proceeds to step 418. In step 418, the algorithm 26 fires the onConversationRun event. Next in step 420, the algorithm 26 determines whether the isRejected=true for the statement selected by the learner 4. If the statement is rejected, the algorithm 26 fires the onRejected event in step 422.

If, in step 420, isRejected≠true then the algorithm 26 next determines whether the sequence of the statement selected is out of order in step 426. If the sequence of the statement selected is out of order, the algorithm 26 fires the OutofSequence event in step 428. If the sequence of the statement selected is not out of order, the algorithm 26 sets the selected task to active in step 428, increments the task occurrence count for the selected task in step 430, and fires the onResponse event in step 432. The algorithm then proceeds to step 442.

Figure 4A:
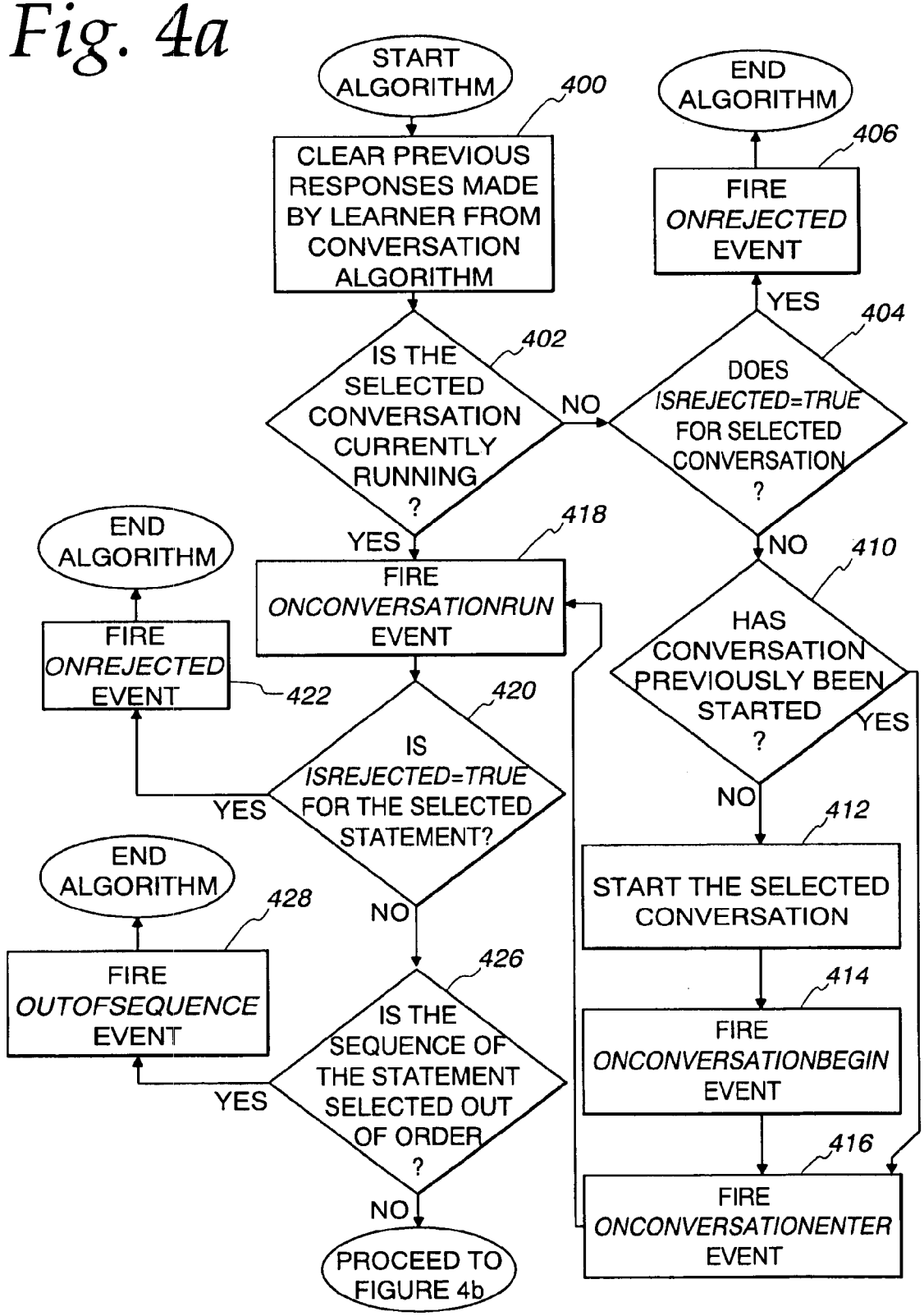
FIG. 4a–e is a flow chart of the system of the present invention according to a preferred embodiment.
Figure 4B:
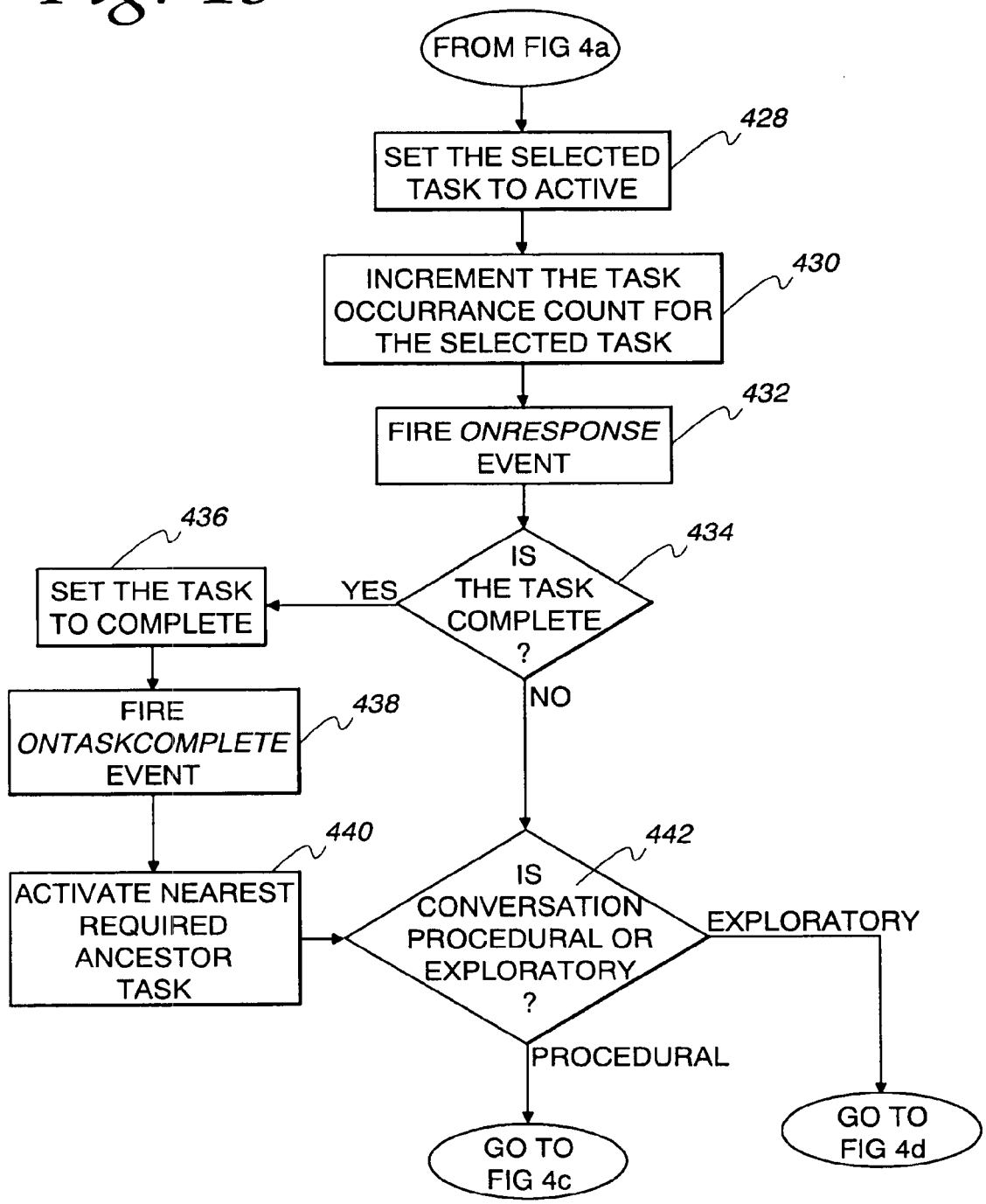
Figure 4C:
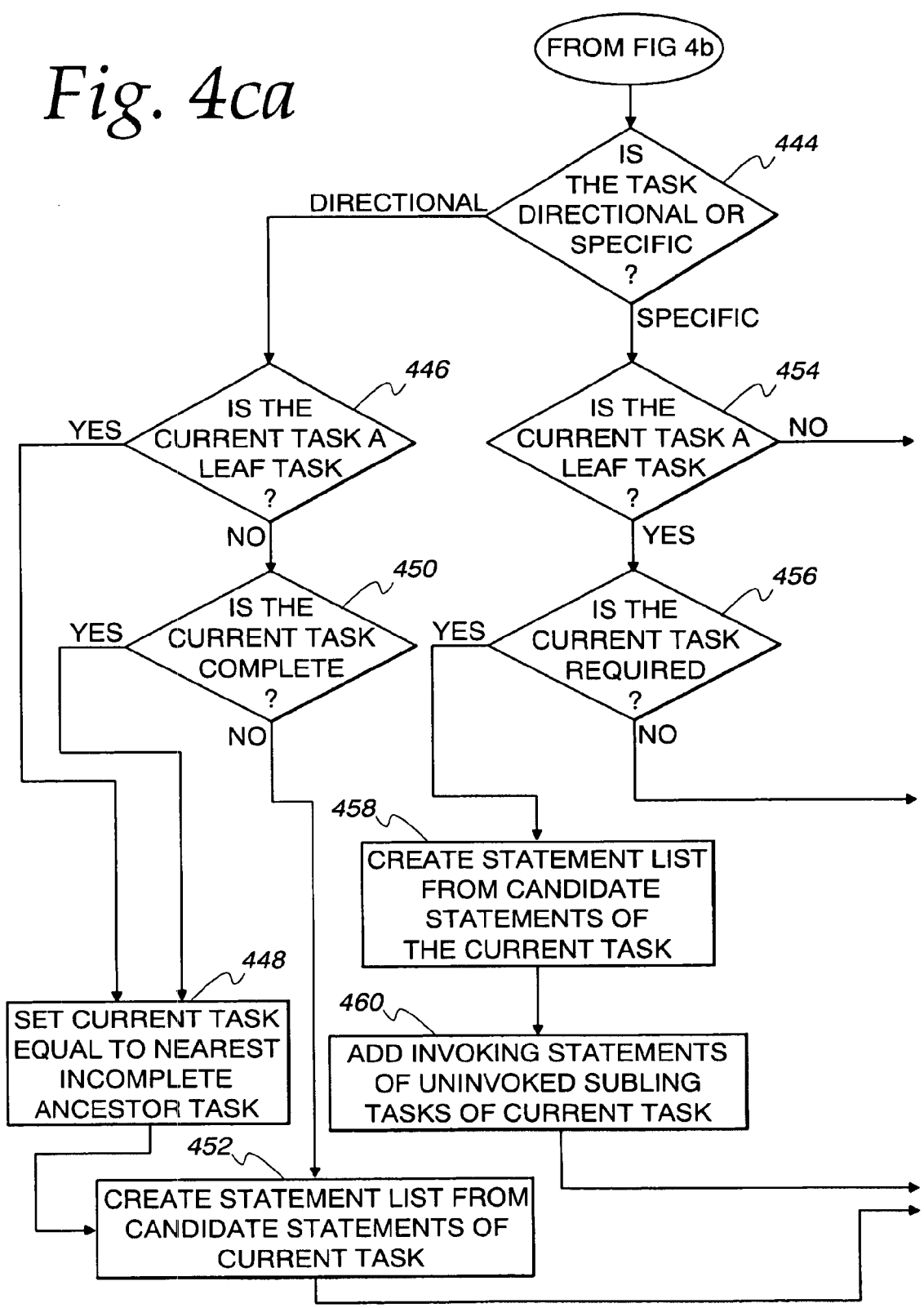
Figure 4C:
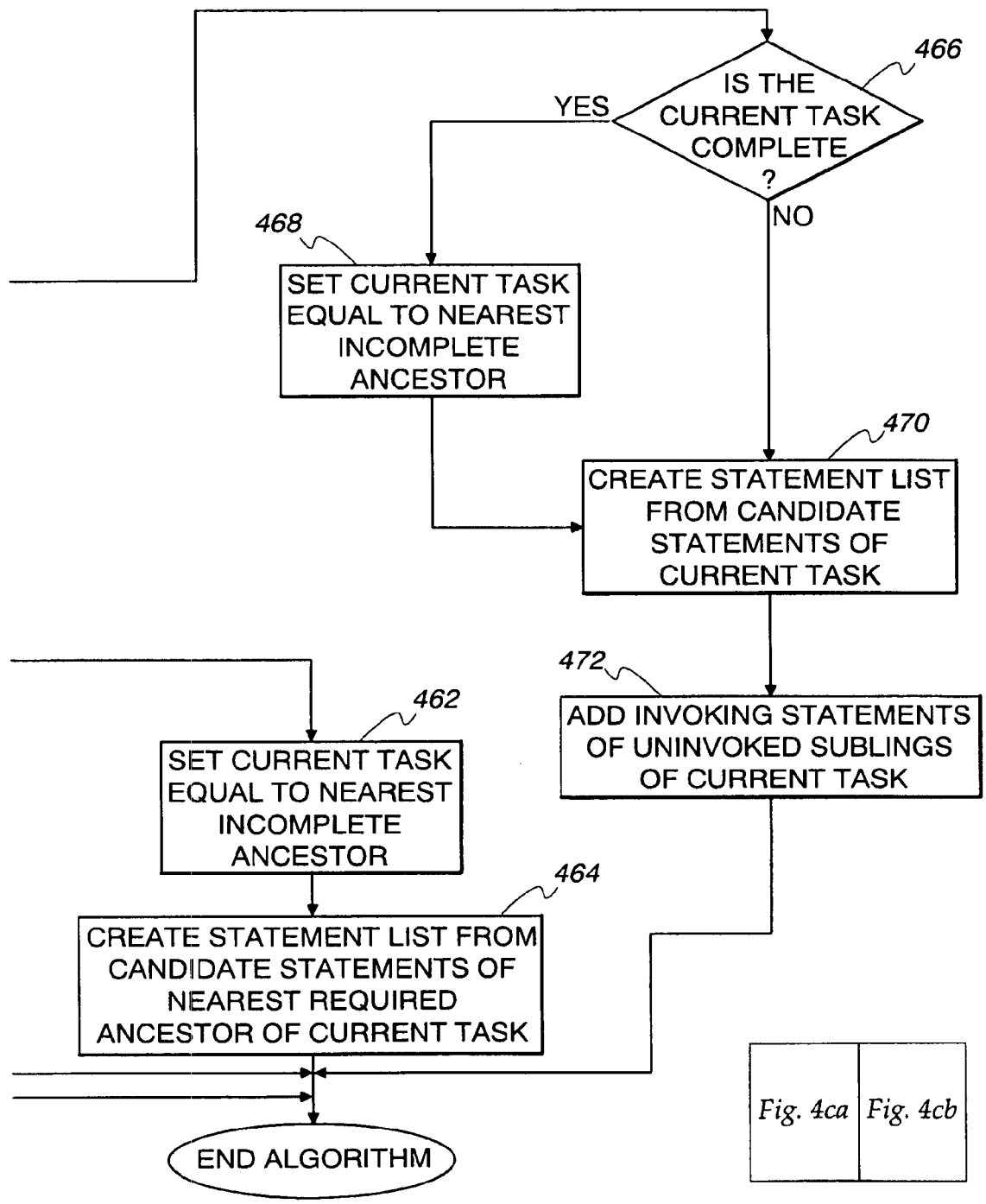

In step 442, the algorithm 26 determines whether the conversation is procedural or exploratory. Referring to FIG. 4c, if the conversation is procedural the conversation algorithm 26 next determines whether the task is directional or specific in step 444. In step 446, the algorithm 26 determines whether the current task is a leaf task. If the current task is a leaf task the algorithm advances to step 436 where the algorithm 26 sets the current task to complete and proceeds to step 448. In step 448, the algorithm 26 sets the nearest incomplete ancestor task 448 as the current task and advances to step 452.

If, in step 446, the current task is not a leaf task the algorithm 26 advances to step 450. In step 450, the algorithm 26 determines whether the current task is complete. If the current task is complete, the algorithm advances to step 436 where the algorithm sets the current task to complete and advances to step 448. Otherwise, the algorithm 26 advances to step 452. In step 452, the algorithm creates a statement list from which a learner may choose a next statement which comprises candidate statements of the current task.

If, in step 444, the conversation is specific, the algorithm 26 advances to step 454. In step 454, the algorithm 26 determines whether the current task is a leaf task. If the current task is a leaf task the algorithm advances to steps 436, 438 and 448 where the algorithm sets the current task to complete, fires the on TaskComplete event, and sets the current task equal to the nearest incomplete ancestor task, respectively. The algorithm next advances to step 456. In step 456, the algorithm 26 determines whether the task is a required task. If the task is required, in step 458, the algorithm 26 creates a statement list from candidate statements of the current task and adds invoking statements of uninvoked sibling tasks of the current task in step 460.

If the current task is not required in step 456, the algorithm 26 proceeds to step 462, where the current task is set equal to the nearest incomplete ancestor task and advancers to step 464. In step 464, the statement list is created from statements of the nearest required ancestor of the current task.

In step 454, if the current task is not a leaf task the algorithm advances to step 466, where the algorithm determines whether the current task is complete. If the current task is complete, the algorithm advances to step 438, where the algorithm 26 fires the OnTaskComplete event. The algorithm next proceeds to step 468 where the current task is set equal to the nearest incomplete ancestor task and further proceeds to step 470. If, in step 466, the current task is not complete, the algorithm 26 advances to step 470 where the statement list is created from candidate statements of the current task. From step 470, the algorithm advances to step 472 where invoking statements of uninvoked siblings of the current task are added to the statement list.

Figure 4D:
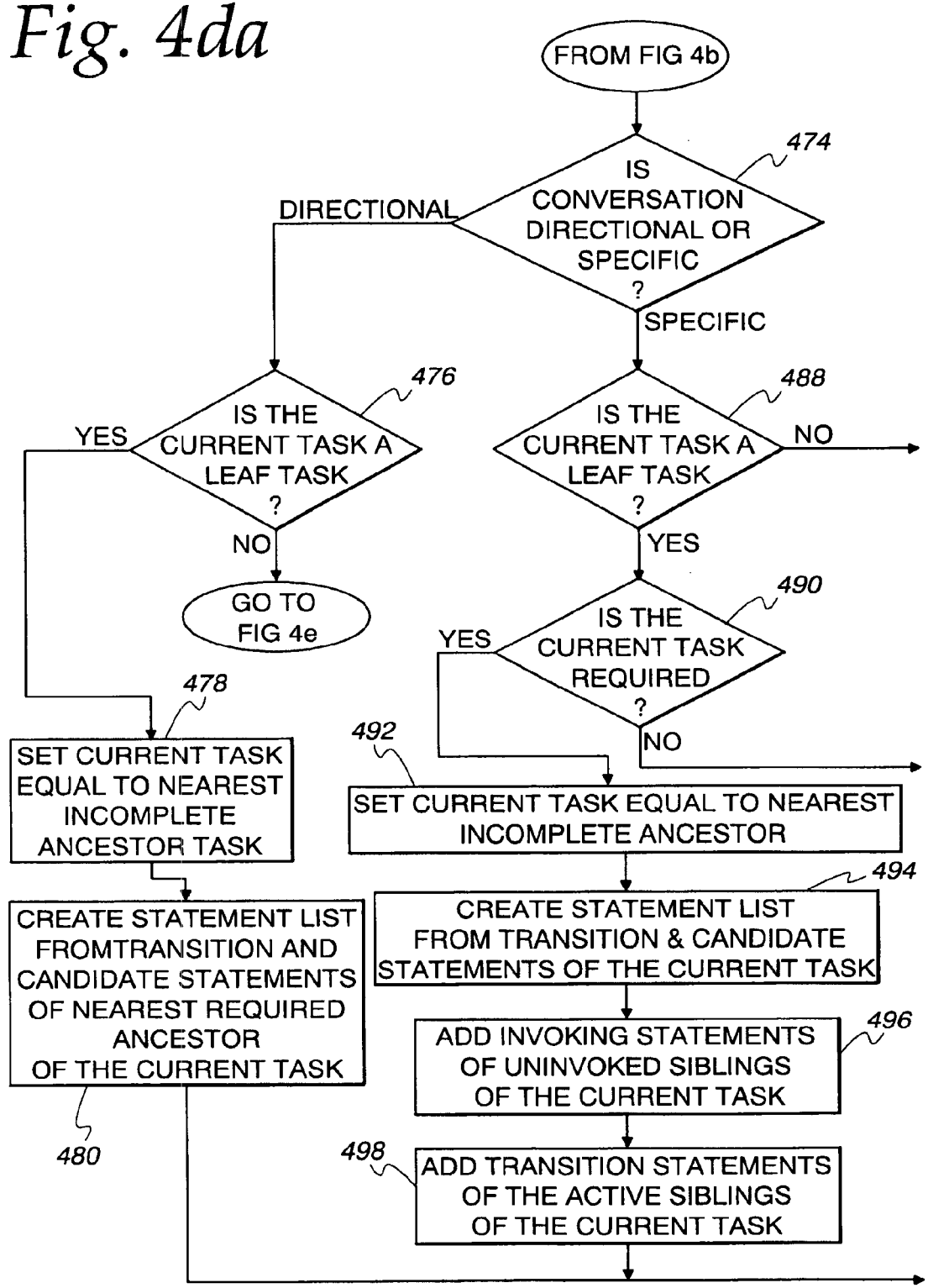
Figure 4D:
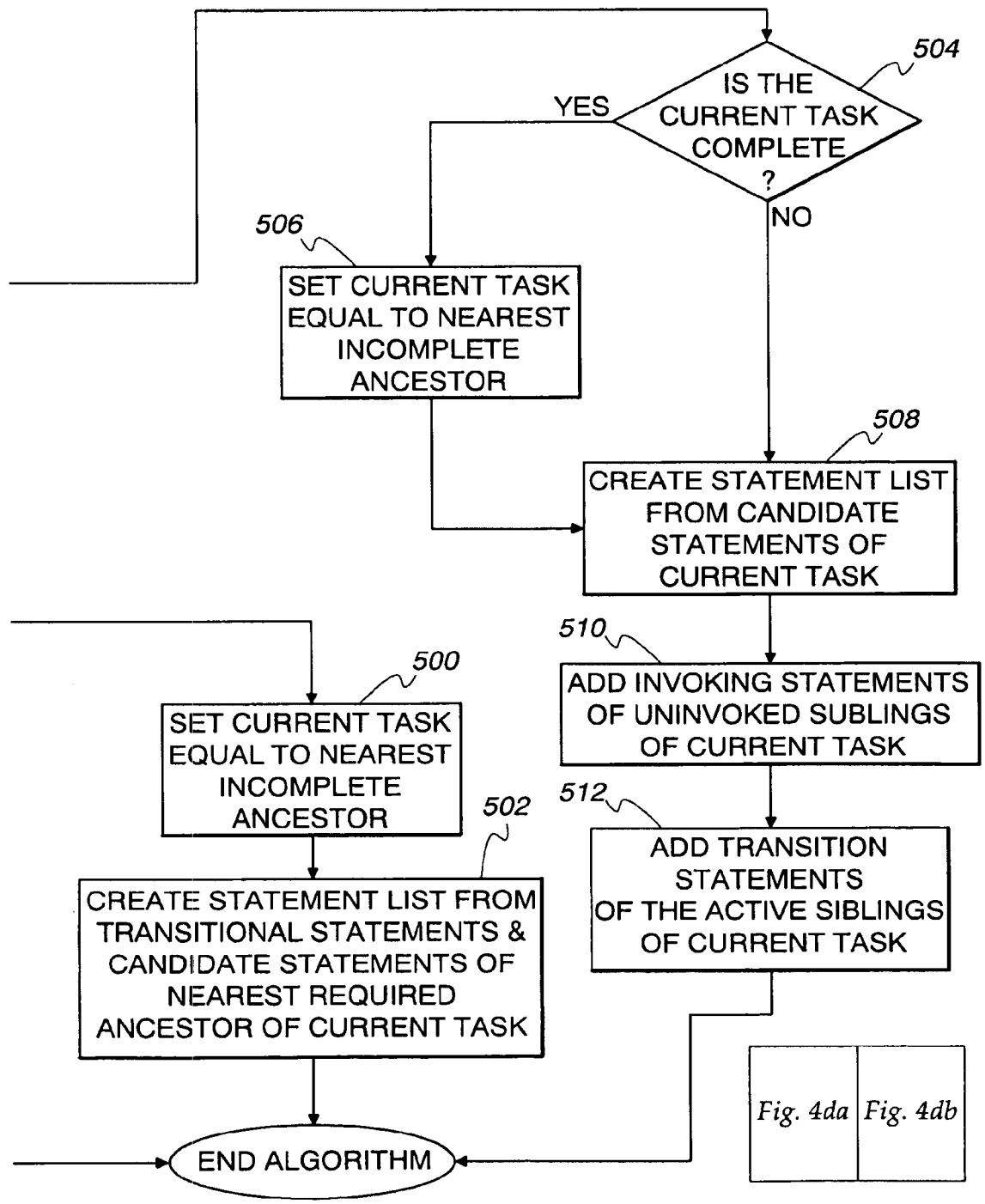

Referring back to FIG. 4*b,* if in step 442 the conversation is exploratory the algorithm proceeds to step 474 (FIG. 4*d*). In step 474, the algorithm inquires as to whether the task is directional or specific. If the conversation is directional the algorithm 26 proceeds to step 476. At step 476, the algorithm 26 determines whether the current task is a leaf task the algorithm 26 proceeds to step 436 and 438, if the current task is a leaf task the algorithm 26 sets the current task to complete in step 436, fires the OnTaskComplete event in step 438 and sets the current task equal to the nearest incomplete ancestor task at step 478 and creates the statement list from transition and candidate statements of the nearest required ancestor of the current task at step 480.

Figure 4E:
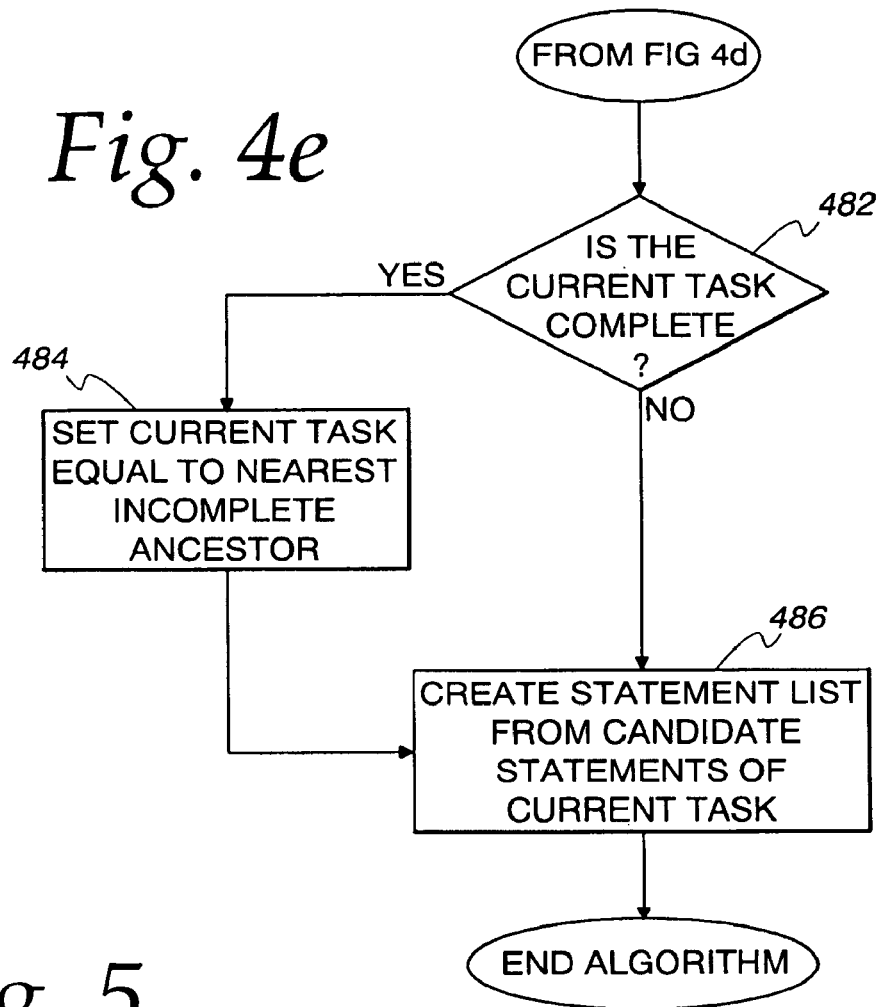

If the current task, at step 476, is not a leaftask, the algorithm 26 proceeds to step 482 (FIG. 4*e*). At step 482, the algorithm 26 determines whether the current task is complete. If the current task is complete, the algorithm 26 fires the OnTaskComplete event at step 438 and advances to step 484. At step 484, the algorithm 26 sets the current task equal to the nearest incomplete ancestor and proceeds to step 486. If at step 476 the current task is not complete, the algorithm 26 proceeds to step 486. At step 486, the algorithm creates the statement list from candidate statements of the current task.

Returning to FIG. 4*d,* if, at step 474, the task is specific, the algorithm proceeds to step 488. At step 488, the algorithm 26 determines whether the current task is a leaf task. If the current task is a leaf task, the algorithm 26 sets the current task to complete, fires the OnTaskComplete event and sets the current task equal to the nearest incomplete ancestor task in step 436, 438 and 478, respectively. The algorithm 26 then proceeds to step 490 where the algorithm determines whether the current task is a required task. If the current task is a required task, the algorithm 26 sets the current task equal to the nearest incomplete ancestor at step 492. The algorithm then creates the statement list from transition and candidate statements of the current task, adds invoking statements of the uninvoked siblings of the current task and adds the transition statements of the active siblings of the current task at steps 494, 496 and 498, respectively. Required statements are necessary because many options may exist in the tree structure for conversing about an irrelevant topic. By making irrelevant topics "unrequired topics," conversations can return to the point in the tree structure where the irrelevant conversation began, the last required task, without having to continue an irrelevant conversation. For example, a conversation with two large branches, one of which is completely irrelevant. If a learner starts down the irrelevant branch, he can go on for a couple of levels of the task and then at the root of the task, a character with whom the learner is talking says, "Let's get back on track here." In this scenario, the algorithm can return all the way back up the tree to the last required task, i.e. at the point where the irrelevant conversation began.

If at step 490 the current task is not a required task, the algorithm proceeds to step 500. At step 500, the algorithm sets the current task equal to the nearest incomplete ancestor task. The algorithm then proceeds to step 502, where the statement list is created from transition and candidate statements of the nearest required ancestor of the current task.

If at step 488 the current ask is not a leaf task, the algorithm 26 determines whether the current task is complete at step 504. If the current task is complete, the algorithm advances to step 438 where the algorithm fires the onTaskComplete event at step 438 and proceeds to step 506, where the current task is set equal to the nearest incomplete ancestor of the current task. The algorithm then proceeds to step 508. If at step 504 the current task is not complete, the algorithm proceeds to step 508, where the statement list is created from candidate statements of the current task. The algorithm 26 then adds invoking statements of uninvoked sibling tasks of the current task and adds transition statements of the active siblings of the current task at steps 510 and 512. The previous algorithm is given by way of example and the conversation algorithm is not limited to the present embodiment.\*\*\*\*

As described above the present invention uses an action and event model in order to execute a simulation. At the highest level, the system contains events, actions and properties. During the execution of the conversation algorithm, the character algorithm or the evaluation algorithm, events are fired in order to control the simulation in response to the happening of the event. Below is an example of actions which can be implemented for a simulation. It will be understood by one of ordinary skill in the art the number of possible actions is limitless and the table below is merely a representative example.

Conversion Engine Action Table

| COMPONENT | ACTION | PARAMETERS | DESCRIPTION |
|---|---|---|---|
| Case | Activate Conversation | Conversation Name | Activates a conversation |
| | End Case | — | Ends the case. This action triggers an on Case End event, which is normally used to bring up the case reflection. |
| World | Move Document | Prop, document, folder | Moves a document to a prep folder. Example of usage: to move a document in the briefcase. |
| | Move Message | Message Name, Folder | Moves a message to a folder. Example of usage: to a message in the email mailbox. |
| | Activate Person | Person | Activates a person. I think we set a person active to be able to Update Dynamic Mode 1 for the person. |
| | Add to Reflection | Section: {High Lights, Good Points, Areas of improvements}, Text: {text} | Adds text to one of the three sections of case reflection. |
| | Activate Place | Place, {true, false} | Sets active state of a place to "true" or "false". Example of usage: to bring up the meeting background image. |
| Case | Activate Conversation | Conversation Name | Activates a conversation |

Conversion Engine Action Table (continued)

| COMPONENT | ACTION | PARAMETERS | DESCRIPTION |
|---|---|---|---|
| | End Case | — | Ends the case. This action triggers an on Case End event, which is normally used to bring up the case reflection. |
| World | Move Document | Prop, document, folder | Moves a document to a prep folder. Example of usage: to move a document in the briefcase. |
| | Move Message | Message Name, Folder | Moves a message to a folder. Example of usage: to a message in the email mailbox. |
| | Activate Person | Person | Activates a person. |
| | Add to Reflection | Section: (High Lights, Good Points, Areas of improvements}, Text: {text} | Adds text to one of the three sections of case reflection. |
| | Activate Place | Place, {true, false} | Sets active state of a place to "true" or "false". Example of usage: to bring up the meeting background image. |
| | Contribute to Objectives | Objective, integer | Adds an integer value to the current proof of an objective. Objectives are normally used to control order of conversations within a case. |
| | Deactivate Phone Ringer | — | Stops phone rings. |
| | Activate Phone Ringer | — | Makes the phone ring. |
| | Set Prop Active State | Prop, {true, false} | Sets the active state of a Prop to "true" or "false". Example: Setting active state of Reflection Prop brings up the reflection in the simulation. |
| | Set Trigger State | Trigger, {true, false} | Sets the active state of a Trigger to "true" or "false". |
| Case | On Case Begin | Set Prop Desktop active state to true Activate Phone Ringer Activate Conversation xxx | Bring up the meeting background image. Make the phone ring. Set the conversation in ready background. |
| | On Case End | Set Prop Reflection active state to true | Brings up reflection. |
| Conversation | Is Visible | Objective xxx is complete, true | Conversation appears in meeting selection list. |
| | On Conversation Begin | Set First Time Entry to false World: xxxx → value = 0 Set Place xxx active state to true | Set a value in the world props. Brings up the meeting background image. |
| | On Conversation xxx | Contribute n to objective | Objection completion is linked to conversation visibility. |
| | On Conversation Enter | Set Person active state to true Set Place active state to true Response (occurrence, statement) | Person with dynamic model must be set to active. Brings up the meeting background image. Send response based on occurrence. |
| | On Conversation Leave | Set Person xxxx active state to false | Deactivate person with dynamic model. |
| | On Conversation Run | If (Get Dynamic Output 1671/Desire to Buy/Desire < 1) THEN {Endcase, response (occurrence, statement)} If (Get Dynamic Output 1671/Desire to Buy/Desire < 1) THEN {End Conversation} | Rules for kick-outs and case completion. |
| Task | Is Hidden | Objective xxxx == false | To hide part of the conversation tree at run Time. |
| | Is Rejected | | |
| | On Completed | Root Task: Complete Conversation. Response (statement) | Completes the conversation. Send response. |
| | on Out of Sequence | Response (occurrence, statement) Update Dynamic Model Desire to Buy/learner Incorrect. | |
| | on Rejected on Response | Update Dynamic Model Desire To Buy/Problem Set Trigger xxxx to true Response (occurrence, statement) | |
| | on Transition | Response (occurrence, statement) | |

The character algorithm 28 controls the status of each character within the simulation. In order to accurately model the "state of mind" of each character and provide character responses which accurately reflect that actor's state of mind each character has a character trait model which represents that character's personality. The character trait model specifies a specific behavior or attitude of the actor. As the learner progresses through the simulation, the actor's behavior or attitude will change with the different learner actions. The purpose of the modeled behavior or attitude is to give the actor a more realistic and natural interaction with the learner.

Depending on the purpose or goal of the simulation, it is necessary to track aspects of the state of mind of a character or characters in order to determine whether the learner has succeeded or failed in his objective. For example if the learner is attempting to learn how to sell a product to a potential customer, it would be desirable to track a character's desire to buy a product from the learner. Therefore, one aspect to the character's traits, or state of mind, is the "desire to buy" or DTB. The DTB at any point in time has a value, a rate of change, and a direction of change and can be tracked according to the following formula:

$$DTB = DTB_0 + C$$

where DTBo is the previous DTB and C is the change in the DTB. C will be negative or positive depending on whether recent action taken by the learner is a "good" which increases the desire to buy or a "bad" which decreases the desire to buy.

When calculating the next DTB value, the character algorithm 28 retrieves the current value of the given trait (e.g. DTB=65%). It also retrieves from the world data structure the direction and rate at which that trait's value is changing. A DTB equal to 65% tells us that the customer is more interested to buy than not to buy. When the rate and direction of change for that trait is added, another level of personality is added. By using the rate and direction information to track a character's DTB, it can be determined whether the learner is gaining ground with the customer or losing ground with the customer.

As mentioned early, during the simulation the learner can affect the character traits of a character with each action the learner takes. Each action creates a force on the DTB.

These forces affect the rate of change of the trait and thus the current value of the trait. The value C above is calculated according to the formula $$C=Co+F$$

Where Co is the previous value of C and F is the sum effect of the learner action onto the actor's character trait. Any action of the learner can apply a force onto the customer's DTB.

For the DTB trait, there are six potential forces a learner's action can have on the actor's character trait. The forces for the DTB trait come from conversations with and without the actor. The first four forces are possible when the learner is interacting directly with the actor: Problem, Solution, Correct, or Incorrect. When the leaner is in a conversation but not with the actor, the two possible forces on the DTB trait are: Positive Decay or Negative Decay.

When the learner is in a conversation with a customer, the statements the learner's possible statements or "selects" are categorized as either neutral, problem, solution, correct, or incorrect. A neutral statement has no affect on the DTB. A correct statement has a positive effect on the DTB. An incorrect statement has a negative affect on the DTB. The amount of force for each statement varies and depends on the design of both the statement itself and the specific instance of the character trait model for the character.

Problem statements are also a positive force on DTB. Problem statements are statements where the learner identifies a problem that the customer has. Solution statements may be a positive force at a certain point in a conversation and negative force until that point in the conversation is reached. This is because a customer will not understand or appreciate a solution that the learner is selling until the customer understands and recognizes the problem that the solution is solving. Therefore, problem statements have a Problem Threshold. The Problem Threshold signifies the minimum number of problem statements that the learner must select before a solution statement has a positive affect on the customer's DTB. If the learner selects a solution statement before the problem threshold is met, the statement will have a negative affect on the DTB, even if it is the correct solution.

When the learner is not interacting with the character, that character is considered to be idle. During this time, positive or negative decay acts to bring the DTB back to its default start value. For example, if the learner tells the customer that the learner has a product that will solve all of their current problems, the customer may have a very high DTB, which indicates that customer will buy now. However, if the learner does not close the deal, negative decay will lower the DTB over time. Likewise, if the learner has negatively impacted the DTB, overtime positive decay will act to increase the customer's DTB as if the customer where "forgetting" the negative impact.

For every character trait, such as DTB, there is a minimum, maximum, and default value for the trait value, the rate of change, and the force. These minimum, maximum, and default values may be set by the simulation designer when creating the specific character trait for a given actor. Typical values for minimum, maximum and default are 0, 100 and 50, respectively.

When an actor has a trait that is reaching its specified minimum or maximum, it becomes increasingly harder to get the trait to that limit. A limit threshold value specifies at what point it becomes harder to continue in the current direction. For example, if the learner is progressing through the simulation on an expert path, the actor's DTB will be increasing with almost every move. Without a limit threshold, the learner's actions would push the actor's DTB off the charts and above the maximum DTB. Or, the behavior of the actor would appear to the learner as unnatural. By placing a dampening affect to the forces applied to the character trait, the actor reaches the maximum value with a more natural approach.

When the actor reaches its limit threshold for the maximum value for DTB, the following formula for calculating C is substituted for the formula for C above:

$$C=(Co+F)*(DTBmax-DTBo)/(DTBhl)$$

where DTBmax is the simulation designer specified maximum DTB value and DTBhl is the designer specified DTB high limit point at which to start using the equation.

A similar equation is substituted when the actor's DTB reaches a minimum threshold value:

$$C=(Co+F)*(DTBo-DTBmin)/(DTBll)$$

where DTBmin is the designer specified minimum DTB value and DTBll is the designer specified DTB low limit point at which to start using the equation.

Optionally, the simulation designer can choose to have a competitor within the simulation compete with the learner to obtain a higher competitor DTB than learner DTB for the customer. The values for the customer's competitor DTB can be either dependent or independent of the learner's actions. Additionally, it is contemplated that an increase in the competitor's DTB could have a negative effect on the learner's DTB, or vice versa.

The evaluation algorithm 30 is a back door to the formalization of the conversation algorithm 26 and the character algorithm 28. With the evaluation algorithm 30, a designer can look at any property in the world and then fire any action based on the evaluation of that property against a variable.

In addition, the evaluation algorithm allows incorporation of third party tools, functions, components or objects. If one wanted to include a neural net, rule based-expert system or any other type external impact, that function can be incorporated into the action side of the evaluation algorithm.

The evaluation algorithm is best described by the following example:

To create a simulation that teaches stockbrokers how to talk with clients about the stock market, a rule-based expert system model of the stock market is included in the simulation via an action in the evaluation algorithm. The user clicks on a statement that the stockbroker should say. That statement is passed to the character engine, which determines which statements to show and which response to display. That same statement is then passed to the character engine, and the character engine variables are updated. Finally, the stock market rule-based model fires an action in the evaluation algorithm. The results of the stock market run then updates the properties of the character engine through another rule in the evaluation engine. In this way, it would be possible to change a stockbroker simulation via the stock market rule-based model and have a completely new simulation without changing any of the conversation statements within the system.

The CORE 32 contains the architecture framework which consist of building blocks of utilities to enable the whole system to work together. Tasks performed by the CORE 32 include: manipulation of custom data structures, item framework, item XML parser, command processor, context framework, event service framework, registry framework, debug/error framework, assertion framework, file IO framework, persistence framework. The CORE 32 operate on concepts which are well known in the art to perform these functions. For example, for more information on assertion framework see Eiffel.com, Building bug-free O-O software: An introduction to Design by Contract, http://www.eiffel.com/doc/manuals/technology/contract/; for error handling framework: see Klaus Renzel, sd&m, Error Handling for Business Information Systems—A Pattern Language, http://www.objectarchitects.de/arcus/cookbook/exhandling/; for messaging framework, see Observer Pattern: Erich Gamma, Richard Helm, Ralph Johnson, and John Vlissides: Design Patterns—Elements of Reusable Object-Oriented Software, Addison-Wesley, 1994 or Publisher—Subscriber Pattern: Frank Bushmann, Regine Meunier, Hans Rohnert, Peter Sommerlad, Michael Stal: A System of Patterns, Wiley, 1996; for user Interface framework, see Sun, Abstract Window Toolkit: http://java.sun.com/products/jdk/awt/; for item framework, see Composite Pattern: Erich Gamma, Richard Helm, Ralph Johnson, and John Vlissides or Design Patterns—Elements of Reusable Object-Oriented Software, Addison-Wesley, 1994; for persistence framework: see Sun, Serializable http://java.sun.com/products/jdk/1.2/docs/api/java/io/Serializable.html; for context and control framework: see Presentation-Abstraction-Control Pattern: Frank Bushmann, Regine Meunier, Hans Rohnert, Peter Sommerlad or Michael Stal: A System of Patterns, Wiley, 1996. The contents of each listed reference is incorporated herein by reference.

Figure 5:
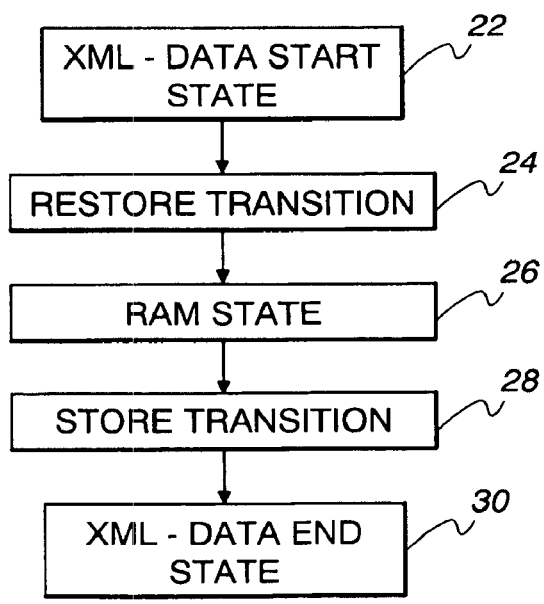
FIG. 5 is a world data model state diagram of the system of the present invention according to a preferred embodiment.

In order to begin and end a simulation, the state of the world must be loaded into memory. Referring to FIG. 5, four steps are implemented in order to change the state of the world from XML data to a version which can be manipulated be the present system. First, in the data start state 122, the world data structure exists as XML data in a relational database on the database server 12; however, it is not limited to that. Next, the XML data from the database server 12 is read into random access memory (RAM) in the restore step 124. Once converted to RAM, the world data model is available to the rest of the system architecture, as explained below. In the RAM state step 126, each XML data variable is converted into an item in an item framework. The conversation algorithm, character algorithm, evaluation algorithm, command processor and prop framework can then read and modify the properties of the world. Next, in the store transition step 128, the RAM version of the world is converted back into an XML string. This event occurs at on command or at intervals in order to save a current state of the world to the database server 12. The XML data which represents the state of the world can now be recalled in order to reset the world to the exact state in which it was saved.

Figure 6:
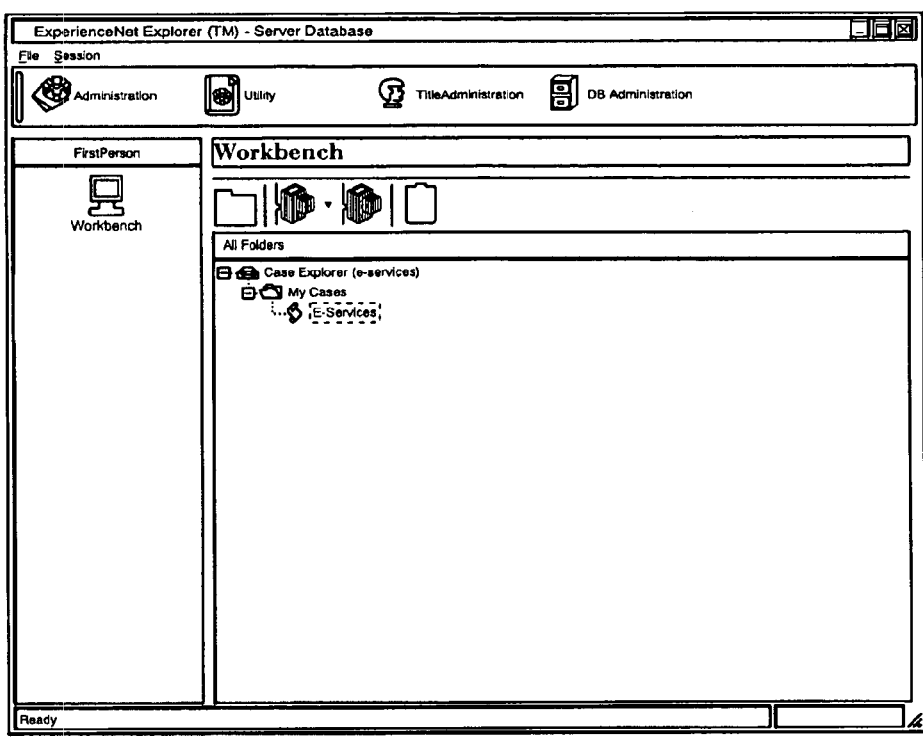
FIG. 6 is a screen shot of the a development tool of the system of the present invention according to a preferred embodiment.
Figure 7:
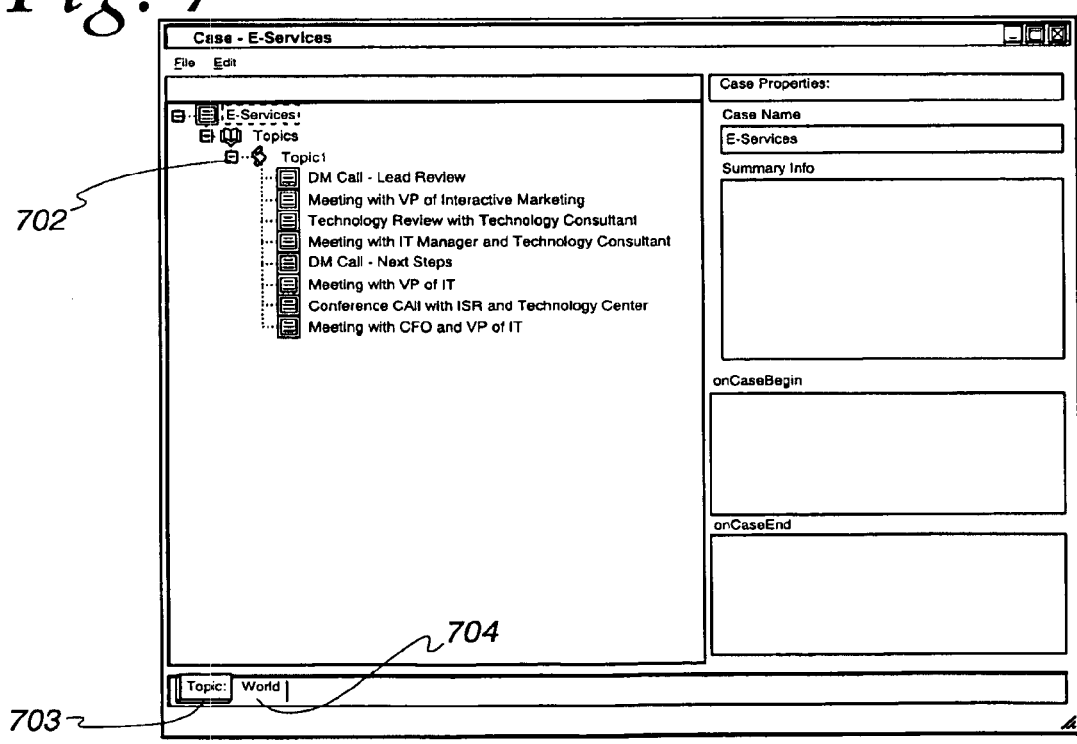
FIG. 7 is a screen shot of the a development tool of the system of the present invention according to a preferred embodiment.
Figure 8:
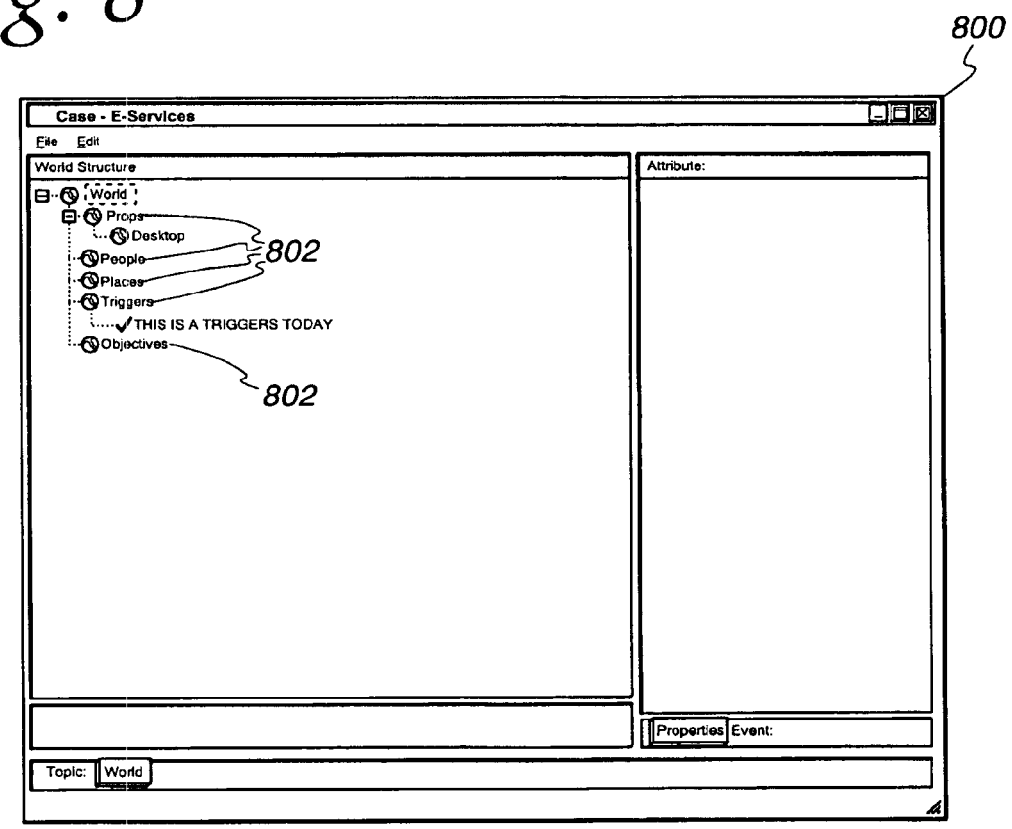
FIG. 8 is a screen shot of the a development tool of the system of the present invention according to a preferred embodiment.

Finally, the present system also comprises a development tool for creating the world data model. Referring to FIG. 6, the development tool provides a case explorer screen 600 which allows a simulation designer to connect to a database and choose different simulations to edit, copy, create or rename. Additionally, the simulation designer can administer simulations by setting the rights of users to edit, copy, create and/or rename simulations. From FIG. 6, the simulation designer can choose a simulation to edit. Once a simulation has been chosen to edit, a case editor screen 700 is available to the simulation designer, as in FIG. 7. The case editor screen displays 700 either the topics 702 associated with a simulation or by selecting a world tab 704, the simulation designer can display the items 802 within the world of the simulation (FIG. 8). By using the case editor screen 700, simulation designer can edit the topics of the simulation and the properties of the case and the world. One has to add new conversation in this editor and then use the conversation editor to edit the conversation.

Figure 9:
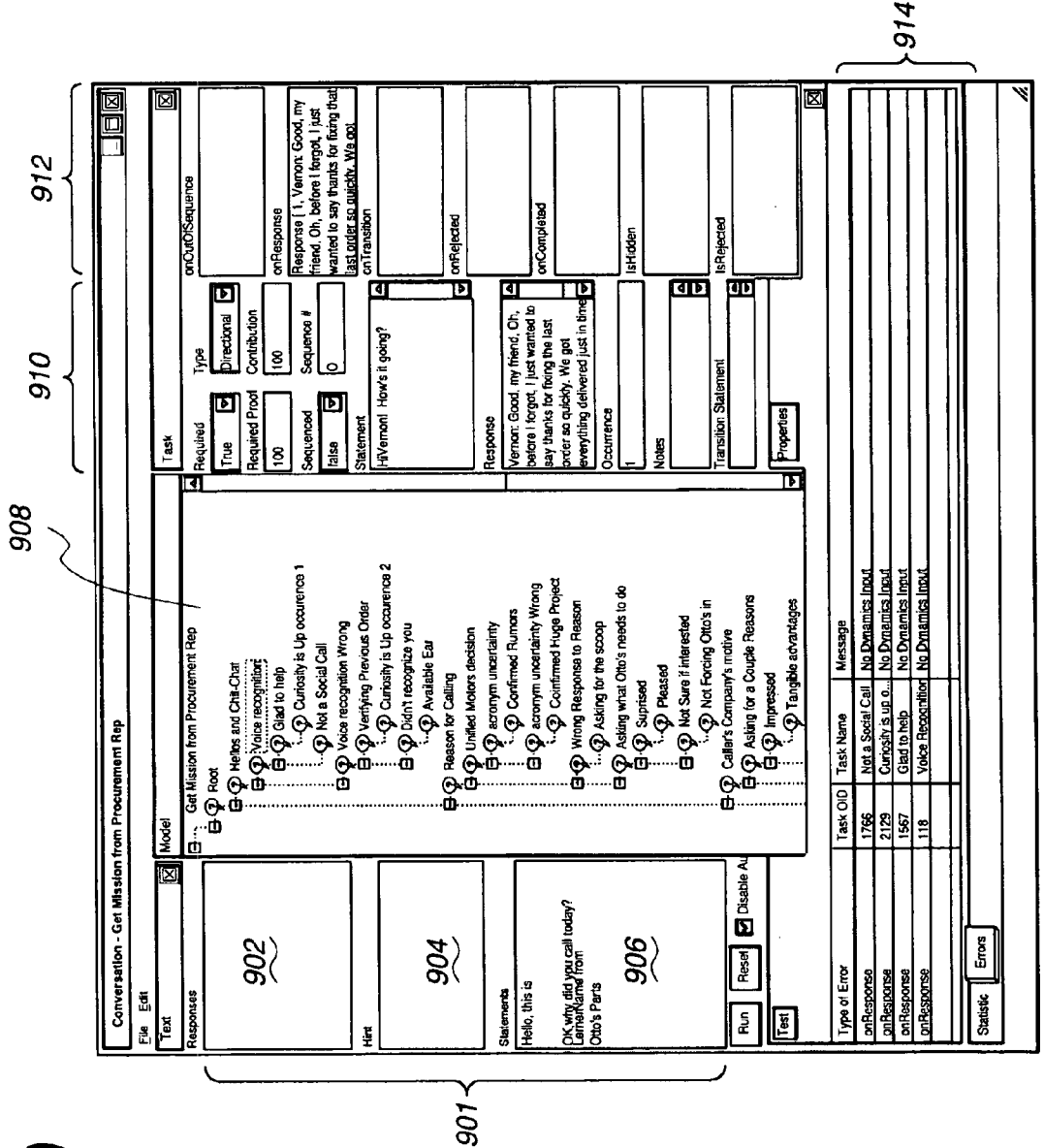
FIG. 9 is a a screen shot of the a development tool of the system of the present invention according to a preferred embodiment.

FIG. 9 shows a conversation editor screen 900 of the development tool. This screen 900 is used to edit conversations and/or create new conversations. The conversation editor screen 900 has a test panel 901 with a response section 902 which shows the possible responses of the learner, a hint window 904 which shows hints available to the learner for the task, a statements window 906 which shows the flow of the conversation. The test panel is the testbed where the conversation can be tested. It also comprises a main window 908 which shows the tasks of the conversation. Also provided is a task properties panel 910 which shows the properties of the selected task in the main window 908. Event panel 912 shows the actions associated with event for the task selected in the main window 908. Finally there is provided an error window 914 which displays errors in the conversation.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

We claim:

1. A computer implemented method of providing a conversation in an educational simulation for a learner comprising the steps of:
   providing simulation software code;
   providing a dynamic data model comprising tasks and statements;
   receiving a statement made by the learner; and
   generating a list of possible statements in response to the received statement for the learner to make from the statements contained within the dynamic data model based on at least one of:
   a. whether the current conversation has an enforced sequence of tasks,
   b. whether the current task allows the learner to move to a sibling task,
   c. whether the current conversation requires completion;
   d. whether the current task is a leaf task,
   e. whether the current task is a required task, or
   f. whether the task is complete.

2. The method of claim 1 wherein the dynamic data model is independent from the simulation software code.

3. The method of claim 1 wherein the list of possible statements comprises candidate statements of the current task when the conversation has an enforced sequence of tasks and the task allows the learner to move to a sibling task.

4. The method of claim 1 wherein the list of possible statements comprises candidate statements of the current task and invoking statements of uninvoked sibling tasks when the conversation has an enforced sequence of tasks and the task allows the learner to move to a sibling task and the task is a required leaf task.

5. The method of claim 1 wherein the list of possible statements comprises candidate statements of the nearest incomplete ancestor task of the current task when the conversation has an enforced sequence of tasks and the task allows the learner to move to a sibling task and the task is a non-required, leaf task.

6. The method of claim 1 wherein the list of possible statements comprises candidate statements of the nearest incomplete ancestor task of the current task and invoking statements of uninvoked sibling tasks of the nearest incomplete ancestor task of the current task when the conversation has an enforced sequence of tasks and the task allows the learner to move to a sibling task and the task is a complete, non-leaf task.

7. The method of claim 1 wherein the list of possible statements comprises candidate statements of the current task and invoking statements of uninvoked sibling tasks of the nearest incomplete ancestor task of the current task when the conversation has an enforced sequence of tasks and the task allows the learner to move to a sibling task and the task is a required, incomplete, non-leaf task.

8. The method of claim 1 wherein the list of possible statements comprises transition and candidate statements of the nearest required ancestor task of the current task when the conversation does not have an enforced sequence of tasks and the task does not allow the learner to move to a sibling task and the task is a leaf task.

9. The method of claim 1 wherein the list of possible statements comprises candidate statements of the nearest required ancestor task of the current task when the conversation does not have an enforced sequence of tasks and the task does not allow the learner to move to a sibling task and the task is a non-leaf task.

10. The method of claim 1 wherein the list of possible statements comprises candidate and transition statements of the nearest incomplete ancestor task and invoking statements of the sibling tasks of the nearest incomplete ancestor task when the conversation does not have an enforced sequence of tasks and the task allows the learner to move to a sibling task and the task is a required leaf task.

11. The method of claim 1 wherein the list of possible statements comprises candidate and transition statements of the nearest incomplete ancestor task when the conversation does not have an enforced sequence of tasks and the task allows the learner to move to a sibling task and the task is a non-required, leaf task.

12. The method of claim 1 wherein the list of possible statements comprises candidate statements of a nearest incomplete ancestor task, invoking statements of uninvoked sibling tasks of the nearest incomplete ancestor task, and transition statements of active sibling tasks of the nearest incomplete ancestor when the conversation does not have an enforced sequence of tasks and the task allows the learner to move to a sibling task and the task is a complete, non-leaf task.

13. The method of claim 1 wherein the list of possible statements comprises candidate statements of the current task, invoking statements of uninvoked sibling tasks of the current task, and transition statements of active sibling tasks of the current task when the conversation does not have an enforced sequence of tasks and the task allows the learner to move to a sibling task and the task is an incomplete, non-leaf task.

14. A computer implemented method of providing a conversation in an educational simulation for a learner comprising the steps of:
    providing simulation software code;
    providing a dynamic data model comprising tasks and statements;
    receiving a statement made by the learner; and
    generating a list of possible statements for the learner to make from the statements within the dynamic data model.

15. The method of claim 14 further comprising the step of determining whether the received statement completes a current task.

16. The method of claim 15 wherein the step of generating a list of possible statements for the learner to make from the statements of the dynamic data model further comprises the steps of:
    determining whether a current conversation is has an enforced sequence of tasks;
    determining whether the current conversation is the conversation requires completion or the conversation does not require completion;
    determining whether the current task is a leaf task or a non-leaf task;
    determining whether current task is a required task,
    generating the list of possible statements based on at least one of the previously determined factors of:
    a. whether the conversation has an enforced sequence of tasks,
    b. whether the current conversation is the conversation does not require completion or the conversation requires completion,
    c. whether the current conversation requires completion;
    d. whether the current task is a leaf or non-leaf task,
    e. whether the current task is a required task, and
    f. whether the task is complete.

17. The method of claim 16 wherein the dynamic data model is independent from the simulation software code.

18. The method of claim 16 wherein the list of possible statements comprises candidate statements of the current task when the conversation has an enforced sequence of tasks and the task allows the learner to move to a sibling task.

19. The method of claim 16 wherein the list of possible statements comprises candidate statements of the current task and invoking statements of uninvoked sibling tasks when the conversation has an enforced sequence of tasks and the task allows the learner to move to a sibling task and the task is a required leaf task.

20. The method of claim 16 wherein the list of possible statements comprises candidate statements of the nearest incomplete ancestor task of the current task when the conversation has an enforced sequence of tasks and the task allows the learner to move to a sibling task and the task is a non-required, leaf task.

21. The method of claim 16 wherein the list of possible statements comprises candidate statements of the nearest incomplete ancestor task of the current task and invoking statements of uninvoked sibling tasks of the nearest incomplete ancestor task of the current task when the conversation has an enforced sequence of tasks and the task allows the learner to move to a sibling task and the task is a complete, non-leaf task.

22. The method of claim 16 wherein the list of possible statements comprises candidate statements of the current task and invoking statements of uninvoked sibling tasks of the nearest incomplete ancestor task of the current task when the conversation has an enforced sequence of tasks and the task allows the learner to move to a sibling task and the task is a required, incomplete, non-leaf task.

23. The method of claim 16 wherein the list of possible statements comprises transition and candidate statements of the nearest required ancestor task of the current task when the conversation does not have an enforced sequence of tasks and the task does not allow the learner to move to a sibling task and the task is a leaf task.

24. The method of claim 16 wherein the list of possible statements comprises candidate statements of the nearest required ancestor task of the current task when the conversation does not have an enforced sequence of tasks and the task does not allow the learner to move to a sibling task and the task is a non-leaf task.

25. The method of claim 16 wherein the list of possible statements comprises candidate and transition statements of the nearest incomplete ancestor task and invoking statements of the sibling tasks of the nearest incomplete ancestor task when the conversation does not have an enforced sequence of tasks and the task allows the learner to move to a sibling task and the task is a required leaf task.

26. The method of claim 16 wherein the list of possible statements comprises candidate and transition statements of the nearest incomplete ancestor task when the conversation does not have an enforced sequence of tasks and the task allows the learner to move to a sibling task and the task is a non-required, leaf task.

27. The method of claim 16 wherein the list of possible statements comprises candidate statements of a nearest incomplete ancestor task, invoking statements of uninvoked sibling tasks of the nearest incomplete ancestor task, and transition statements of active sibling tasks of the nearest incomplete ancestor when the conversation does not have an enforced sequence of tasks and the task allows the learner to move to a sibling task and the task is a complete, non-leaf task.

28. The method of claim 16 wherein the list of possible statements comprises candidate statements of the current task, invoking statements of uninvoked sibling tasks of the current task, and transition statements of active sibling tasks of the current task when the conversation does not have an enforced sequence of tasks and the task allows the learner to move to a sibling task and the task is an incomplete, non-leaf task.

29. A computer implemented system for creating a conversation in an educational simulation for a learner comprising:
   means for providing simulation software code;
   means for providing a dynamic data model comprising tasks and statements;
   means for receiving a statement made by the learner; and
   means for generating a list of possible statements for the learner to make from the statements within the dynamic data model.

30. The system of claim 29 further comprising means for determining whether the received statement completes a current task.

* * * * *